(12) United States Patent
Battle

(10) Patent No.: US 7,668,359 B2
(45) Date of Patent: Feb. 23, 2010

(54) AUTOMATIC DETECTION OF REGIONS (SUCH AS, E.G., RENAL REGIONS, INCLUDING, E.G., KIDNEY REGIONS) IN DYNAMIC IMAGING STUDIES

(75) Inventor: Xavier Battle, Oak Park, IL (US)

(73) Assignee: Siemens Meidcal Solutions USA, Inc., Malvern, PA (US)

( * ) Notice: Subject to any disclaimer, the term of this patent is extended or adjusted under 35 U.S.C. 154(b) by 521 days.

(21) Appl. No.: 11/165,981

(22) Filed: Jun. 24, 2005

(65) Prior Publication Data

US 2005/0286768 A1 Dec. 29, 2005

(51) Int. Cl.
*G06K 9/00* (2006.01)
(52) U.S. Cl. ...................................... 382/131
(58) Field of Classification Search .......... 382/128–132
See application file for complete search history.

(56) References Cited

U.S. PATENT DOCUMENTS

| | | | | |
|---|---|---|---|---|
| 5,873,824 A | * | 2/1999 | Doi et al. ............... | 600/408 |
| 6,249,594 B1 | * | 6/2001 | Hibbard .................. | 382/128 |
| 2002/0191844 A1 | * | 12/2002 | Lee et al. ................ | 382/166 |

OTHER PUBLICATIONS

Experimental comparison of data transformation procedures for analysis of principal components.Sámal M, Kárný M, Benali H, Backfrieder W, Todd-Pokropek A, Bergmann H. Phys Med Biol. Nov. 1999;44(11):2821-34.*
The use of principal components in the quantitative analysis of gamma camera dynamic studies. D C Barber. 1980 Phys. Med. Biol. 25 283.*
Frouin F., De Cesare A., Bouchareb, Y., Todd-Pokropek A., Herment, A.: Spatial regularization applied to factor analysis of medical image sequences. Phys. Med. Biol. 44 (1999) 2289-2306.*
Hermansen F, Lammertsma AA. Linear dimension reduction of sequences of medical images: III. Factor analysis in signal space. Phys. Med. Biol. 1996;41:1469-1481.*

* cited by examiner

Primary Examiner—Bhavesh M Mehta
Assistant Examiner—Hadi Akhavannik
(74) Attorney, Agent, or Firm—Peter L. Kendall

(57) ABSTRACT

In some preferred embodiments, a system for the automatic identification of cortical and/or medulla regions of the kidneys in renal dynamic studies is provided that includes: a computer module configured to perform principal component analysis on a dynamic sequence corresponding to only one of the kidneys based on a linear combination of the first few component images with coefficients for the principal component analysis as normalization factors.

20 Claims, 17 Drawing Sheets

FIG. 9A

```
; Reads in a Dynamic DICOM image filename = Dialog-pickfile(/READ, filter='*.*', TITLE='please Select
(ESOFT) Dicom Data')
imgdataOriginal = dcm_read(filename, parameters)
;print, 'Number of Rows = ' parameters.num_rows
;print, 'Number of Columns = ', parameters.num_cols
;print, 'Total Number of Frames = ', parameters.num_frames_tot
;print, 'Number of phases = ', parameters.dynamic_phase
;print, 'Dynamic frames = ', parameters.dynamic_frames
;print, 'Dynamic frames index = ', parameters.dynamic_frame_index ; Creates an array of dynamic sequences with all the phases.
ptrImgPhase = ptrarr(parameters.dynamic_phase)

; Creates an array of composite images for all the phases
imgComposite =
fltarr(parameters.num_rows,parameters.num_cols,parameters.dynamic_phase)

startIndex = 0
endIndex = startIndex + parameters.dynamic_frames[0] -1
;print, 'Start Index = ', startIndex
;print, 'End Index = ', endIndex
ptrImgPhase[0] = ptr_new(imgdataOriginal [*,*,startIndex:endIndex])
; Calculates the first composite images
for index=startIndex,endIndex do begin
  imgComposite[*,*,0] = imgComposite[*,*,0] + imgdataOriginal [*,*,index]
endfor for phase = 1,parameters.dynamic_phase-1 do begin
  startIndex = endIndex + 1
  endIndex = startIndex + parameters.dynamic_frames[phase]-1
  ;print, 'Start Index = ' startIndex
  ;print, 'End Index = ' endIndex
  ptrImgPhase[phase] = ptr_new(imgdataOriginal [*,*,startIndex:endIndex])

; Calculates the composite images
  for index=startIndex,endIndex do begin
      imgComposite[*,*,phase] = imgComposite[*,*,phase] +
imgdataOriginal [*,*,index]
   endfor
endfor ; Extracts the second phase and displays it
numberOfFrames = parameters.dynamic_frames[1]
imgData = fltarr(parameters.num_cols,parameters.num_rows,numberofFrames)
imgData = *(ptrImgphase[1])
; Displays the sequences in separate windows
windowIndex = 0
window, windowIndex,xs=800,ys=600,title='Raw images Phase 2'
windowIndex = windowIndex + 1
loadct,0
imageSize = sqrt(800.0*600.0/numberOfFrames)
```

FIG. 9B

```
for i=0,numberofFrames-1 do
tv, bytscl (congrid(imgData [*,*,i] , imageSize,imageSize)),i ; calculates the composite image
sumImg = imgData[*,*,0] * 0.0
for x=0,parameters.num_cols-1 do begin
 for y=0,parameters.num_rows-1 do begin
     sumImg[x,y] = total(imgData[x,y,0:numberofFrames/2-1])
 endfor
endfor ; Method to separate kidneys and bladder.
method = 1 if method eq 1 then begin

; smoothes it, rebins it to a smaller size and thresholds the image at 50%
kernel = fltarr(5,5) + 1.0
kernel = kernel/total(kernel)
;smoothedSumImg = convol(sumImg,kernel,/CENTER)
smoothedSumImg = sumImg
ratioX = 1
ratioY = 1
smallerSizeX = parameters.num_rows / ratioX
smallerSizeY = parameters.num_cols / ratioY
binarySumImg = rebin(smoothedSumImg,smallerSizeX,smallerSizeY)
maxSumImg = mean(binarySumImg)
print, 'MaxSumImg = ' , max(binarySumImg)
print, 'MinsumImg = ' , min(binarySumImg)
print, 'MediansumImg = ' , median(binarySumImg)
print, 'MeanSumImg = ' , mean(binarysumImg)

for x=0,smallersizeX-1 do begin
 for y=0,smallerSizeY-1 do begin
     if binarySumImg[x,y] LT maxSumImg*4.0 then binarySumImg[x,y] = 0 else
binarySumImg[x,y] = 1
 endfor
endfor ; Dilation to remove islands
form = fltarr(2,3) + 1.0
binarySumImg = erode(binarySumImg, form)

binarySumImg = dilate(binarySumImg,form)
;binarySumImg = dilate(binarySumImg,form)
;binarySumImg = dilate(binarySumImg,form)
;binarySumImg = dilate(binarySumImg,form)
;form = fltarr(1,6) + 1
;binarySumImg = dilate(binarySumImg,form)
;binarySumImg = dilate(binarySumImg,form)
```

FIG. 9C

```
; Displays the composite and thresholded image
window, windowIndex,xs=800,ys=600,title='SumImg'
windowIndex = windowIndex + 1
surface, rebin(smoothedSumImg,64,64)

window, windowIndex,xs=800,ys=600,title='Composite Image Phase 2'
windowIndex = windowIndex + 1
loadct,0
imageSize = sqrt(800.0*600.0/9.0)
tv,bytscl(congrid(sumImg,imageSize,imageSize, CUBIC=-1)),0
tv,bytscl(congrid(smoothedSumImg,imageSize,imageSize)),1
tv,bytscl(congrid(binarySumImg,imageSize,imageSize)),2

; Finds the horizontal line separating the kidneys from the bladder
y=0
while ((max(binarySumImg[*,y]) EQ 0) and (y LT smallerSizeY-1)) do y = y+1
yBeginKidneys = (y-1)
while ((max(binarySumImg[*,y]) EQ 1) and (y LT smallerSizeY-1)) do y = y+1
yEndKidneys = (y+0)
if y LT smallerSizeY then yBegin = y else yBegin = -1
while ((max(binarySumImg[*,y]) EQ 0) and (y LT smallerSizeY-1)) do y = y+1
if y LT smallerSizeY then yEnd = y else yEnd = -1
if (yBegin NE -1) AND (yEnd NE -1) then separationY =
round(0.5*(yEnd+Ybegin)) else separationY = -1
;print, 'YBegin = ' , yBegin
;print, YEnd = ', yEnd
;print, 'separationY = ',separationY ; Finds the vertical line separating the kidneys
if separationY EQ -1 then sepY = 0 else sepY = separationY
x = 0
while ((max(binarySumImg[x,yBeginKidneys:yEndKidneys]) EQ 0) and (x LT
smallerSizex-1)) do x = x+1
xBeginLeftKidney = (x-1)
while ((max(binarySumImg[x,yBeginKidneys:yEndKidneys]) EQ 1) and (x LT
smallerSizex-1)) do x = x+1
xEndLeftKidney = (x+0)
if x LT smallerSizeX then xBegin = x else xBegin = -1
while ((max(binarySumImg[x,yBeginKidneys:yEndKidneys]) EQ 0) and (x LT
smallerSizeX-1)) do x = x+1
xBeginRightKidney = (x-1)
if x LT smallerSizex then xEnd = x else xEnd = -1
if (xBegin NE -1) AND (xEnd NE -1) then separationX =
round(0.5*(xEnd+xbegin)) else separationX = -1
while ((max(binarySumImg[x,yBeginKidneys:yEndKidneys]) EQ 1) and (x LT
smallerSizeX-1)) do x = x+1
xEndRightKidney = (x+0)

; Refines the vertical positions on each individual kidney
y=0
```

FIG. 9D

```
while ((max(binarySumImg[xBeginLeftKidney:xEndLeftKidney,y])) EQ 0) and (y
LT smallerSizeY-1)) do y = y+1
yBeginLeftKidney = (y-1)
while ((max(binarySumImg[xBeginLeftKidney:xEndLeftKidney,y])) EQ 1) and (y
LT smallerSizeY-1)) do y = y+1
yEndLeftKidney = (y+0)

y=0
while ((max(binarySumImg[xBeginRightKidney:xEndRightKidney,y])) EQ 0) and (y
LT smallerSizeY-1)) do y = y+1
yBeginRightKidney = (y-1)
while ((max(binarySumImg[xBeginRightKidney:xEndRightKidney,y])) EQ 1) and (y
LT smallerSizeY-1)) do y = y+1
yEndRightKidney = (y+0)

; Takes the ratio into account
xBeginLeftKidney = xBeginLeftKidney*ratioX
xEndLeftKidney = xEndLeftKidney*ratioX
xBeginRightKidney = xBeginRightKidney*ratioX
xEndRightKidney = xEndRightKidney*ratioX yBeginLeftKidney = yBeginLeftKidney*ratioY
yEndLeftKidney = yEndLeftKidney*ratioY
yBeginRightKidney = yBeginRightKidney*ratioY
yEndRightKidney = yEndRightKidney*ratioY yBeginKidneys = yBeginKidneys*ratioY
yEndKidneys = yEndKidneys*ratioY ;print, 'XBegin = ', xBegin
;print, XEnd = ', xEnd
;print, 'separationX = ',separationX ; Displays the horizontal and vertical lines on the composite image
compositeDisplay = rebin(sumImg,smallerSizeX,smallerSizeY)
if separationY NE -1 then for x=0,smallerSizeX-1 do
compositeDisplay[x,separationY] = max(sumImg)
if separationX NE -1 then for y=0,sepY do compositeDisplay[separationX,y] =
max(sumImg)
tv,bytscl(congrid(compositeDisplay,imageSize,imageSize)),3
endif if method eq 2 then begin ratioX = 1
ratioY = 1
; Calculates the 'vertical projection'
verticalProjection = rebin(total(sumImg,1),parameters.num_rows/ratioY)
window, windowIndex,xs=640,ys=480,title='vertical projection'
windowIndex = windowIndex + 1
plot,verticalProjection
```

FIG. 9E

```
; Finds the 'middle' point
max1 = max(verticalProjection)
max2 = max(verticalProjection[where(verticalProjection LT max1)])
index1 = where(verticalProjection eq max1)
index2 = where(verticalProjection eq max2)
separationY = 0.5 * ( index1[0] + index2[0]) * ratioY horizontalProjection =
rebin (total(sumImg[*,0:separationY],2),parameters.num_cols/ratioX)
window, windowIndex,xs=640,ys=480,title='Horizontal projection'
windowIndex = windowIndex + 1
plot,horizontalProjection
; Finds the 'middle' point
max1 = max(horizontalProjection)
max2 = max(horizontalProjection[where(horizontalProjection LT max1)])
index1 = where(horizontalProjection eq max1)
index2 = where(horizontalProjection eq max2)
separationX = 0.5 * ( index1[0] + index2[0]) * ratioX ;window, windowIndex,xs=800,ys=600,title='Composite Image Phase 2'
;windowIndex = windowIndex + 1
;loadct,0
;imageSize = sqrt(800.0*600.0/4.0)
;tv,bytscl(congrid(sumImg,imageSize,imagesize, CUBIC=-1)),0
;compositeDisplay = sumImg
;if separationY NE -1 then for x=0,parameters.num_cols-1 do
compositeDisplay[x,separationY] = max(sumImg)
;if separationX NE -1 then for y=0,separationY do
compositeDisplay[separationX,y] = max(sumImg)
;tv,bytscl(congrid(compositeDisplay,imageSize,imageSize)),1 endif

; Calculates the time activity curve for the 'bladder' compartment.
;bladderTAC = fltarr(numberofFrames)
;for frame=0,numberofFrames-1 do bladderTAC[frame] =
total(imgData[*,separationY*ratioY:parameters.num_rows_1,frame])
;window, windowIndex,xs=800,ys=600,title='Bladder TAC'
;windowIndex = windowIndex + 1
;plot, bladderTAC ; Extracts the two sequences for the two kidneys leftKidneySizeX = xEndLeftKidney-xBeginLeftKidney+1
leftKidneySizeY = yEndLeftKidney - yBeginLeftKidney+1
;leftKidneySequence =
fltarr(separationX*ratioX, separationY*ratioY,numberofFrames/2)
;leftKidneySequence = imgData[0:separationX*ratioX-1,0:separationY*ratioY-1,0:numberofFrames/2-1]
leftKidneySequence =
fltarr(leftKidneySizex,leftKidneySizeY,numberofFrames/2)
```

FIG. 9F

```
leftKidneySequence =
imgData[xBeginLeftKidney:xEndLeftKidney,yBeginLeftKidney:yEndLeftKidney,0:n
umberofFrames/2-1]

rightKidneySizeX = xEndRightKidney-xBeginRightKidney+1
rightKidneySizeY = yEndRightKidney -yBeginRightKidney+1
;rightKidneySequence = fltarr(parameters.num_cols -
separationX*ratioX,separationY*ratioY,numberofFrames/2)
;rightKidneySequence = imgData[separationX*ratioX:parameters.num_cols-
1,0:separationY*ratioY-1,0:numberOfFrames/2-1]
rightKidneySequence =
fltarr(rightKidneySizeX,rightKidneySizeY,numberofFrames/2)
rightKidneySequence =
imgData[xBeginRightKidney:xEndRightKidney,yBeginRightKidney:yEndRightKidney
,0:numberOfFrames/2-1]

; runs the PCA on the two sequences
principal_components,leftKidneySequence,leftKidneyComp,leftKidneyVecs,leftK
idneyVals
principal_components,rightKidneySequence,rightKidneyComp,rightKidneyVecs,ri
ghtKidneyVals ; shows the first 3 factors for both.
window, windowIndex,xs=800,ys=600,title='Left Kidney PCA'
windowIndex = windowIndex + 1
loadct,0
imageSize = sqrt(640.0*480.0/9.0)
for i=0,2 do
tv,bytscl(congrid((leftKidneyComp[*,*,i]),imageSize,imageSize)),i leftMask = leftKidneyComp[*,*,0]
maxLeft = max(leftKidneyComp[*,*,0])
for x= 0,leftKidneySizeX-1 do begin
 for y = 0,leftKidneySizeY-1 do begin
    if leftMask[x,y] gt 0.3 * maxLeft then leftMask[x,y] = 1.0 else
leftMask[x,y] = 0.0
 endfor
endfor form = fltarr(2,2)+1.0
;leftMask = erode(leftMask,form)
;leftMask = erode(leftMask,form)

tv,bytscl(congrid(leftMask,imageSize,imageSize)),3
print, 'Left comp total = ', total(leftKidneyComp[*,*,1])
print, 'Left Eigen Values = ',leftKidneyVals[0:2]

leftImage1 =
leftKidneyComp[*,*,0] + leftKidneyComp[*,*,1]*(max(leftKidneyComp [*,*,0])/abs
(min(leftKidneyComp[*,*,1])))
```

FIG. 9G

```
leftImage2 = leftKidneyComp[*,*,0]-
leftKidneyComp [*,*,1]*(max(leftKidneyComp[*,*,0])/abs (min(-
leftKidneyComp [*,*,1])))

leftImage1NoNeg = leftImage1
leftImage2NoNeg = leftImage2
for x= 0,leftKidneySizex-1 do begin
 for y = 0,leftKidneySizeY-1 do begin
     if leftImage1NoNeg[x,y] lt 0.0 then leftImage1NoNeg[x,y]= 0.0 else
leftImage1NoNeg[x,y]= 1.0
     if leftImage2NoNeg[x,y] lt 0.0 then leftImage2NoNeg[x,y]= 0.0 else
leftImage2NoNeg[x,y]= 1.0
 endfor
endfor if total(leftMask * leftImage1NoNeg) gt total(leftMask * leftImage2NoNeg)
then leftImage = leftImage1 else leftImage = leftImage2 print, 'Left result1 total = ', total( leftImage1)
print, 'Left result2 total = ', total( leftImage2)

tv,bytscl(congrid(leftImage,imageSize,imageSize)),4
tv, bytscl(congrid(leftImage1NoNeg*leftMask,imageSize,imageSize)),5
tv, bytscl(congrid(leftImage2NoNeg*leftMask,imageSize,imageSize)),6 window, windowIndex,xs=800,ys=600,title='Right Kidney PCA'
windowIndex = windowIndex + 1
loadct,0
imageSize = sqrt(640.0*480.0/9.0)
for i=0,2 do
tv, bytscl(congrid((rightKidneyComp[*,*,i]),imageSize,imageSize)),i rightMask = rightKidneyComp[*,*,0]
maxRight = max(rightKidneyComp[*,*,0])
for x= 0,rightKidneySizeX-1 do begin
 for y = 0,rightKidneySizeY-1 do begin
     if rightMask[x,y] gt 0.3 * maxRight then rightMask[x,y] = 1.0 else
rightMask[x,y] = 0.0
 endfor
endfor
form = fltarr(2,2) + 1.0
;rightMask = erode(rightMask,form)
;rightMask = erode(rightMask,form)

tv,bytscl(congrid(rightMask,imageSize,imageSize)),3 print, 'Right comp total = ', total(rightKidneyComp[*,*,1])
print, 'Right Eigen Values = ',rightKidneyVals[0:2]
```

FIG. 9H

```
rightImage1 =
rightKidneyComp[*,*,0]+rightKidneyComp[*,*,1]*(max(rightKidneyComp[*,*,0]) /
abs(min(rightKidneyComp[*,*,1])))
rightImage2 = rightKidneyComp[*,*,0] -
rightKidneyComp[*,*,1]*(max(rightKidneyComp[*,*,0])/abs(min( -
rightKidneyComp[*,*,1])))

rightImage1NoNeg = rightImage1
rightImage2NoNeg = rightImage2
for x= 0,rightKidneySizeX-1 do begin
  for y = 0,rightKidneySizeY-1 do begin
       if rightImage1NoNeg[x,y] lt 0.0 then rightImage1NoNeg[x,y]= 0.0 else
rightImage1NoNeg[x,y]= 1.0
       if rightImage2NoNeg[x,y] lt 0.0 then rightImage2NoNeg[x,y]= 0.0 else
rightImage2NoNeg[x,y]= 1.0
 endfor
endfor if total(rightMask * rightImage1NoNeg) gt total(rightMask *
rightImage2NoNeg) then rightImage = rightImage1 else rightImage =
rightImage2 print, 'Right result1 total = ', total( rightImage1)
print, 'Right result2 total = ', total( rightImage2)

tv,bytscl(congrid(rightImage,imageSize,imageSize)),4
tv, bytscl(congrid(rightImage1NoNeg*rightMask,imageSize,imageSize)),5
tv, bytscl(congrid(rightImage2NoNeg*rightMask,imageSize,imageSize)),6

; Recreates a composite-like image for Bruce
imgSaved = fltarr(parameters.num_cols,parameters.num_rows)
imgSaved[xBeginLeftKidney:xEndLeftKidney,yBeginLeftKidney:yEndLeftKidney] =
leftImage*max(rightImage)
imgSaved[xBeginRightKidney:xEndRightKidney,yBeginRightKidney:yEndRightKidne
y] = rightImage*max(leftImage)

imgSaveInt = uintarr(parameters.num_cols,parameters.num_rows)
imgSaveInt = uint(round((imgSaved-min(imgSaved))/(max(imgSaved)-
min(imgSaved)) * 65535))

imgSavedThreshold = imgSavedInt
maxImgSaved = max(imgSaved)
sumImgThreshold = sumImg
maxSumImg = max(sumImg)
for x= 0,parameters.num_cols-1 do begin
 for y = 0,parameters.num_rows-1 do begin
       if imgSaved[x,y] lt 0.3 * maxImgSaved then imgSavedThreshold[x,y] =
uint(0) ;else rightMask[x,y] = 0.0
       if sumImg[x,y] lt 0.3 * maxSumImg then sumImgThreshold[x,y] =
uint(0) ;else rightMask[x,y] = 0.0
 endfor
```

FIG. 9I

```
endfor window, windowIndex,xs=800,ys=600,title='Final result'
windowIndex = windowIndex + 1
loadct,3
imageSize = sqrt(640.0*480.0/4)
tv, bytscl(congrid(imgSaved,imageSize,imageSize,CUBIC=-1)),0
tv, bytscl(congrid(imgSavedThreshold,imageSize,imageSize)),15
tv, bytscl(congrid(sumImg,imageSize,imageSize,CUBIC=1)),2
tv, bytscl(congrid(sumImgThreshold,imageSize,imageSize)),3

; Saves the image
filenameImg = filename + '-img'
OPENW, 1, filenameImg
WRITEU, 1, imgSavedInt
CLOSE, 1
filenameImg = filename + '-threshold'
OPENNW, 1, filenameImg
WRITEU, 1, imgSavedThreshold
CLOSE, 1 end
```

AUTOMATIC DETECTION OF REGIONS (SUCH AS, E.G., RENAL REGIONS, INCLUDING, E.G., KIDNEY REGIONS) IN DYNAMIC IMAGING STUDIES

BACKGROUND

1. Field of the Invention

The present invention relates generally to imaging systems and, more particularly, to systems and methods for detecting regions, such as, e.g., kidney regions in renal dynamic studies.

2. Discussion of the Background

A variety of medical imaging systems are known. Some illustrative imaging systems include nuclear medical imaging systems (e.g., gamma cameras), computed tomography (CT or CAT) systems, magnetic resonance imaging (MRI) systems, positron-emission tomography (PET) systems, ultrasound systems and/or the like.

With respect to nuclear medical imaging systems, nuclear medicine is a unique medical specialty wherein radiation (e.g., gamma radiation) is used to acquire images that show, e.g., the function and/or anatomy of organs, bones and/or tissues of the body. Typically, radioactive compounds, called radiopharmaceuticals or tracers, are introduced into the body, either by injection or ingestion, and are attracted to specific organs, bones or tissues of interest. These radiopharmaceuticals produce gamma photon emissions that emanate from the body and are captured by a scintillation crystal, with which the photons interact to produce flashes of light or "events." These events can be detected by, e.g., an array of photodetectors, such as photomultiplier tubes, and their spatial locations or positions can be calculated and stored. In this manner, an image of an organ, tissue or the like under study can be created from the detection of the distribution of the radioisotopes in the body.

FIG. 1 depicts components of a typical nuclear medical imaging system 100 (i.e., having a gamma camera or a scintillation camera) which includes a gantry 102 supporting one or more detectors 108 enclosed within a metal housing and movably supported proximate a patient 106 located on a patient support (e.g., pallet) 104. Typically, the positions of the detectors 108 can be changed to a variety of orientations to obtain images of a patient's body from various directions. In many instances, a data acquisition console 200 (e.g., with a user interface and/or display) is located proximate a patient during use for a technologist 107 to manipulate during data acquisition. In addition to the data acquisition console 200, images are often developed via a processing computer system which is operated at another image processing computer console including, e.g., an operator interface and a display, which may often be located in another room, to develop images. By way of example, the image acquisition data may, in some instances, be transmitted to the processing computer system after acquisition using the acquisition console.

In, for example, nuclear medical imaging, as well as in other types of imaging, dynamic studies are often employed. For example, dynamic studies may involve a study in which the temporal distribution of a radioactive tracer is analyzed. Of the various methods for performing dynamic studies of gamma camera and the like images, principal component analyses and factor analyses have been employed. See e.g. *The Use of Principal Components in the Quantitative Analysis of Gamma Camera Dynamic Studies*, D. C. Barber, Phys. Med. Biol. 25 No 2 (March 1980) 283-292, incorporated by reference below ("The reduction of the enormous quantity of data in a radionuclide dynamic study to a few diagnostic parameters presents a problem. Conventional methods of data reduction using regions-of-interest or functional images have several defects which potentially limit their usefulness. Using a principal components analysis of the elemental curves representing the change of activity with time in each pixel, followed by a further factor analysis, it is possible to extract the fundamental functional changes of activity which underlie the observed variation of activity. An example of this analysis on a dynamic brain scan suggests that the three fundamental phases of activity represent activity in the arterial system, the venous system and diffusion of tracer into the tissues.")

A background discussion of factor analysis of dynamic studies (FADS) is presented in the following article *Background Assessment of brain perfusion using parametric and factor images extracted from dynamic contrast-enhanced MR images* of A. L. Martel and A. R. Moody, University of Nottingham, as incorporated herein-below:

"Factor analysis is a useful technique for extracting information from a dynamic study without making any a priori assumptions about physiology. In the factor model it is assumed both that the correlations between a set of observed variables can be explained in terms of a set of latent variables and that the number of latent variables present in a data set is less than the number of observed variables. These latent variables or factors will often describe some physical property of the system being observed. Alternatively, they may be theoretical constructs which have no physiological significance but which simplify the task of interpreting the data. The dynamic study can be represented by the (T×N) matrix D, where T is the number of frames in the study and N is the number of pixels in each frame. Each row of the matrix represents an image in the sequence and each column represents a pixel signal intensity curve. If M is equal to the number of kinetic compartments present in the data, F is the (T×M) column matrix of factor curves, A is the (M×N) matrix of factor images and E is the matrix of unique factors then the dynamic study can be represented by the equation $$D = FA + E \qquad (1)$$

The movement of the contrast agent through a compartment is assumed to be homogeneous, i.e. the time course of tracer through a compartment should be spatially invariant. If this assumption is true and if sufficient factors have been identified then the variance represented by the matrix E is due to random noise only. In practice inhomogeneities do exist but we assume that these account for a very small proportion of the total variance.

Since there are an infinite number of possible solutions to equation (1) it is necessary to apply constraints in order to obtain a unique solution. Principal Components Analysis (PCA) uses a statistical constraint to obtain a unique set of orthogonal factors with no a priori assumptions being made about the data. The PC curves are obtained by extracting the eigenvectors of the covariance matrix C (given by $DD^*$) in decreasing order of importance, i.e. $l_i > l_{i+1}$ where $l_i$ is the eigenvalue corresponding to the i'th eigenvector $\underline{u}_i$. Since the first PC accounts for most of the information in the study, with subsequent PCs containing progressively less, it can be assumed that there exists a subset of M PCs which account for all of the useful information, with the remaining (T−M) PCs representing pure noise. The dynamic study can therefore be represented by $$D = \sum_{i=1}^{M} \lambda_i \underline{u}_i \underline{v}_i^t + \sum_{i=M+1}^{r} \lambda_i \underline{u}_i \underline{v}_i^t \qquad (2)$$

where $\underline{u}_i$ is the (T element) i'th principal component curve and $\underline{v}_i$ is the corresponding (N element) vector of coefficients.

Occasionally it is possible to obtain useful information from the orthogonal PCs, for example an area of increased or decreased perfusion may appear as a focal anomaly on one or more of the PC images. Physiological studies, however, are often more usefully represented by oblique factors. The problem of identifying a set of physiologically meaningful oblique factors can be simplified by extracting the first M principal components in order to reduce the dimensionality of the data set, and then rotating these components under the control of certain constraints. Substituting for D from equation (2) in equation (1) and ignoring the residual matrix E gives $$FA = U^* \sqrt{R^*} V^* \qquad (3)$$

where $U^*$ is the (T×M) orthonormal column matrix containing the first M eigenvectors, $V^*$ is the (M×N) row matrix of coefficients and $R^*$ is the diagonal matrix of eigenvalues. F and A can therefore be represented by $$F = (U^* \sqrt{R^*}) T \qquad (4a)$$

and $$A = T^{-1} V \qquad (4b)$$

where T is an (M×M) rotation matrix and $TT^{-1} = I$. Much of the work on FADS has been carried out on dynamic nuclear medicine studies and various constraints have been proposed. The one most commonly used is the positivity constraint [1] which assumes that neither the factor images nor the factor curves should contain any negative values. This constraint has been applied to various types of nuclear medicine studies [2,3] and more recently to contrast enhanced MRI studies [4,5] with some success. The positivity constraint is not sufficient on its own to produce a unique solution [6] and the use of additional constraints has been investigated [7,8,9]. We have used a modified version of the apex-seeking technique [1] which incorporates the following constraints appropriate for dynamic contrast enhanced MRI studies:

Positivity constraint. Since the signal intensity increases in proportion to the concentration of contrast agent for T1 weighted images, there should be no negative values in either F or A.

Uniform background. We assume that the first factor to be extracted will correspond to a non-enhancing background factor. The factor curve corresponding to the background is obtained by projecting a uniform signal intensity curve onto the subspace defined by the matrix $U^*$. This allows for any fluctuations in background signal intensity during the study to be taken into account.

Zeroes constraint. All of the non-background factor curves extracted from the data will have zero amplitude for the first 15 seconds, as the contrast is not administered until the 5'th image.

In most cases three factors can be extracted from the data: a background or non-enhancing factor, an early vascular factor which is strongly correlated to arterial flow, and a late vascular factor which is strongly correlated to venous flow. In this way, functional images characterizing brain perfusion can be obtained without imposing any model upon the data."

A number of illustrative background systems and methods are shown in the following U.S. patents, the entire disclosures of which are incorporated herein by reference:

1. U.S. Pat. No. 5,634,469, entitled Method for Localizing a Site of Origin of Electrical Heart Activity, issued on Jun. 3, 1997, listed as assigned to Siemens Aktiengesellschaft.
2. U.S. Pat. No. 5,887,074, entitled Local Principal Component Based Method for Detecting Activation Signals In Functional MR Images, issued on Mar. 23, 1999, listed as assigned to Siemens Corporate Research, Inc.

In addition, a number of further illustrative background systems and methods are shown in the following publications, the entire disclosures of which are incorporated herein by reference:

1. *The use of principal components in the quantitative analysis of gamma camera dynamic studies*, D C Barber, Phys. Med. Biol. 25 No 2 (March 1980) 283-292.
2. *Towards automatic analysis of dynamic radionuclide studies using principal-components factor analysis*, K S Nijran and D C Barber 1985 Phys. Med. Biol. 30 1315-1325 ("A method is proposed fpr automatic analysis of dynamic radionuclide studies using the mathematical technique of principal-components factor analysis. This method is considered as a possible alternative to the conventional manual regions-of-interest method widely used. The method emphasizes the importance of introducing a priori information into the analysis about the physiology of at least one of the functional structures in a study. Information is added by using suitable mathematical models to describe the underlying physiological processes. A single physiological factor is extracted representing the particular dynamic structure of interest. Two spaces 'study space, S' and 'theory space, T' are defined in the formation of the concept of intersection of spaces. A one-dimensional intersection space is computed. An example from a dynamic 99T cm DTPA kidney study is used to demonstrate the principle inherent in the method proposed. The method requires no correction for the blood background activity, necessary when processing by the manual method. The careful isolation of the kidney by means of region of interest is not required. The method is therefore less prone to operator influence and can be automated.")
3. *A quantitative comparison of some FADS methods in renal dynamic studies using simulated and phantom data*, A S Houston and W F D Sampson, Phys. Med. Biol. 42 No 1 (January 1997) 199-217.
4. *Rotation to simple structure in factor analysis of dynamic radionuclide studies*, M Samal, M Karny, H Surova, E Marikova and Z Dienstbier, Phys. Med. Biol. 32 No 3 (March 1987) 371-382.
5. *Factor analysis of dynamic function studies using a priori Physiological information (nuclear medicine)*, K S Nijran and D C Barber, Phys. Med. Biol. 31 No 10 (October 1986) 1107-1117.
6. *The determination of the number of statistically significant factors in factor analysis of dynamic structures*, P Hannequin, J C Liehn and J Valeyre, Phys. Med. Biol. 34 No 9 (September 1989) 1213-1227.
7. *On the existence of an unambiguous solution in factor analysis of dynamic studies*, M Samal, M Karny, H Surova, P Penicka, E Marikova and Z Dienstbier, Phys. Med. Biol. 34 No 2 (February 1989) 223-228.

8. *Background correction in factor analysis of dynamic scintigraphic studies: necessity and implementation*, M Van Daele, J Joosten, P Devos, A Vandecruys, J L Willems and M De Roo, Phys. Med. Biol. 35 No 11 (November 1990) 1477-1485.
9. *A statistical model for the determination of the optimal metric in factor analysis of medical image sequences* (*FAMIS*), H Benali, I Buvat, F Frouin, J P Bazin and R Di Paola, Phys. Med. Biol. 38 No 8 (August 1993) 1065-1080.
10. *Linear dimension reduction of sequences of medical images: III. Factor analysis in signal space*, Flemming Hermansen and Adriaan A Lammertsma, Phys. Med. Biol. 41 No 8 (August 1996) 1469-1481.
11. *A control systems approach for the simulation of renal dynamic software phantoms for nuclear medicine*, Alexander S Houston, William F D Sampson, Romina M J Jose and James F Boyce Phys. Med. Biol. 44 No 2 (February 1999) 401-411.
12. *Statistical distribution of factors and factor images in factor analysis of medical image sequences*, I Buvat, H Benali and R Di Paola, Phys. Med. Biol. 43 No 6 (June 1998) 1695-1711.
13. *Factor analysis with a priori knowledge—application in dynamic cardiac SPECT*, A Sitek, E V R Di Bella and G T Gullberg, Phys. Med. Biol. 45 No 9 (1 Sep. 2000) 2619-2638.
14. *Assessment of brain perfusion using parametric and factor images extracted from dynamic contrast-enhanced MR images*, A. L. Martel and A. R. Moody, University of Nottingham (quoted above).

While a variety of systems and methods related to dynamic analyses exist, there remains a need for, inter alia, improved systems and methods that enable, e.g., automatic detection of regions, especially, e.g., kidney regions, in dynamic studies. For example, the detection of the cortical region of the kidneys is an important part in the evaluation of renal functions. However, existing automated methods do not work well. In fact, this is typically performed manually, but the manual method is time consuming and requires significant expertise of the operator. While, as described above, principal component analyses and factor analyses are well known techniques and have been implemented in some background environments, there are no existing techniques that accurately and automatically determine, e.g., the cortical region of the kidneys.

Thus, while a variety of systems and methods are known, there remains a continued need for improved systems and methods overcoming the above and/or other problems with existing systems and methods.

SUMMARY OF THE PREFERRED EMBODIMENTS

The preferred embodiments of the present invention can significantly improve upon existing methods and/or apparatuses.

According to some preferred embodiments of the invention, a method for the automatic detection of kidney regions is performed that includes: a) identifying a first region of interest around a first kidney and a second region of interest around a second kidney; b) extracting separate dynamic sequences from the respective regions of interest; and c) performing principal component analysis on the respective dynamic sequences separately. Preferably, the performing principal component analysis includes, for each of the dynamic sequences, linearly combining the first few component images. In some embodiments, the linearly combining further includes calculating coefficients for the principal component analysis as normalization factors between counts in the first few component images. Preferably, the linearly combining further includes calculating coefficients based on absolute values. More preferably, the linear combing based on the following formula:

$$C0 + C1 * (\max C0 / \text{abs}(\min C1));\qquad \text{f1}$$

$$C0 - C1 * (\max C0 / \text{abs}(-\min C1)).\qquad \text{f2}$$

In the preferred embodiments, the first few components includes between the first 2 to 4 components, and, most preferably, 3 components.

According to some other embodiments, a system configured for the automatic detection of kidney regions, comprising: a) means for identifying a first region of interest around a first kidney and a second region of interest around a second kidney; b) means for extracting respective dynamic sequences from the respective regions of interest; and c) means for performing principal component analysis on the respective dynamic sequences separately.

According to some other preferred embodiments, a system configured for the automatic detection of organ regions is provided that includes: a) a medical imaging camera for acquiring a time-sequence of images encompassing a plurality of organ regions of a patient; b) an identification module configured to identify regions of interest within the time-sequence of images relating to separate ones of the plurality of organ regions of the patient; c) an extraction module configured to extract respective dynamic sequences from the respective regions of interest; and d) an analysis module configured to perform principal component analysis on the respective dynamic sequences separately and to linearly combine the first few component images for each of the dynamic sequences.

According to some other embodiments, a system for the automatic identification of cortical and/or medulla regions of the kidneys in renal dynamic studies is provided that includes: a computer module configured to perform principal component analysis on a dynamic sequence corresponding to only one of the kidneys based on a linear combination of the first few component images with coefficients for the principal component analysis as normalization factors.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIGS. 9(A) to 9(I) show an illustrative code, written in the general purpose computer language Interactive Data Language (IDL) that can be employed and in order to implement some of the illustrative and non-limiting embodiments of the present invention.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Illustrative Computer Environments:

In various embodiments, process steps described herein can be performed using one or more computer(s) and/or one or more network of computer(s), such as a local area network (LAN), a wide area network (WAN), the Internet and/or another network. In various embodiments, one or more server(s), client computer(s), application computer(s) and/or other computer(s) can be utilized to implement one or more aspect of the invention. Illustrative computers can include, e.g.: a central processing unit; memory (e.g., RAM, etc.); digital data storage (e.g., hard drives, etc.); input/output ports (e.g., parallel and/or serial ports, etc.); data entry devices (e.g., key boards, etc.); etc.

Figure 3:
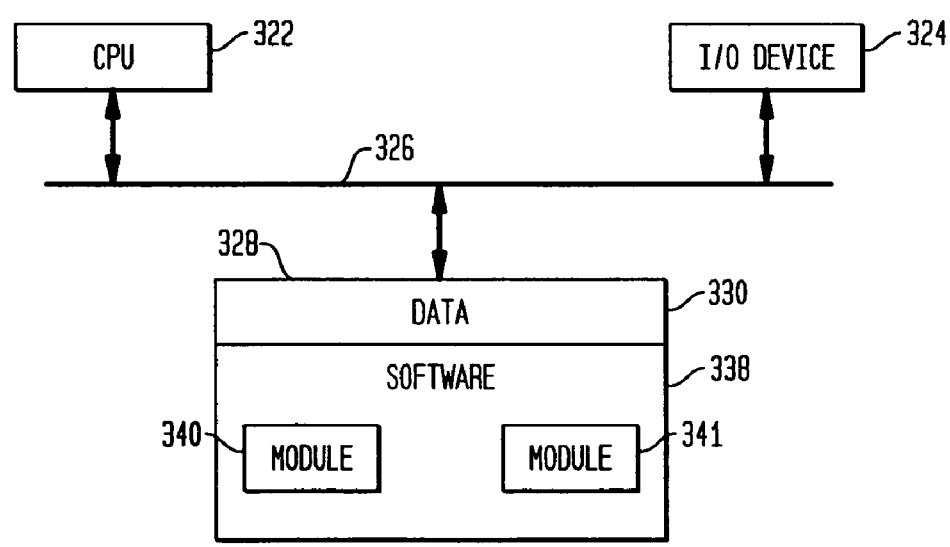
FIG. 3 shows an illustrative computer system that can be used to implement computerized process steps in some embodiments of the invention.

FIG. 3 shows an illustrative computer 320 that can be used to implement computerized process steps in some embodiments of the invention. In some embodiments, the computer 320 includes a central processing unit (CPU) 322, which can communicate with a set of input/output (I/O) device(s) 324 over a bus 326. The I/O devices 324 can include, for example, a keyboard, a mouse, a video monitor, a printer, and/or other devices.

The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, in some examples, image data and/or other data 330. The software 338 can include a number of modules 340 for implementing the steps of processes. Conventional programming techniques may be used to implement these modules. Memory 328 can also store the above and/or other data file(s).

In some embodiments, the various methods described herein may be implemented via a computer program product for use with a computer system. The computer program product may include a series of computer executabale instructions fixed on a tangible computer readable medium (e.g., a diskette, a CD-ROM, ROM or the like). The computer instructions can be written in various programming languages and/or can be stored in memory device(s), such as semiconductor devices(e.g., chips or circuits), magnetic devices, optical devices and/or other memory devices. While various processes can be performed using computer software programs, one or more of the process steps could be carried out using hardware, firmware and/or software, depending on circumstances.

By way of illustration, FIGS. 9(A) to 9(J) show an illustrative code, written in the general purpose computer language Interactive Data Language (IDL) that can be employed and in order to implement some of the illustrative and non-limiting embodiments of the present invention. It should be appreciated that FIGS. 9(A) to 9(J) merely show one illustrative and non-limiting embodiment. First, a wide variety of other programming languages could be use to carry out the processes performed in that illustrated embodiment. Second, the methodologies employed could be varied greatly within the broad scope of the present invention. In the interpretation of the claims, the structure for all means-plus-function elements should not be improperly interpreted as corresponding to a computer programmed with the specific illustrative program as shown in FIGS. 9(A) to 9(J). Any and all means-plus-function elements that have structural correspondence to a programmed computer, hardware and/or firmware should be interpreted as such programmed computer, hardware and/or firmware programmed or configured to perform the recited function without requiring any specific programming shown in FIGS. 9(A)-9(B).

The Preferred Embodiments:

According to some preferred embodiments of the invention, a methodology is provided that enables the automatic detection and segmenting of the regions of the kidneys on dynamic renal images. While principles of the invention are described in the context of dynamic renal images and kidney detection, it is contemplated that principles herein may be used to create embodiments employed in other applications, such as, e.g., with respect to dynamic analyses related to a patent's lung(s), heart, brain and/or other organ(s) of interest. However, it should be appreciated that while underlying principles may be used to create embodiments extending to other applications, the most preferred embodiments described herein are most particularly suited for renal dynamic studies.

Figure 1:
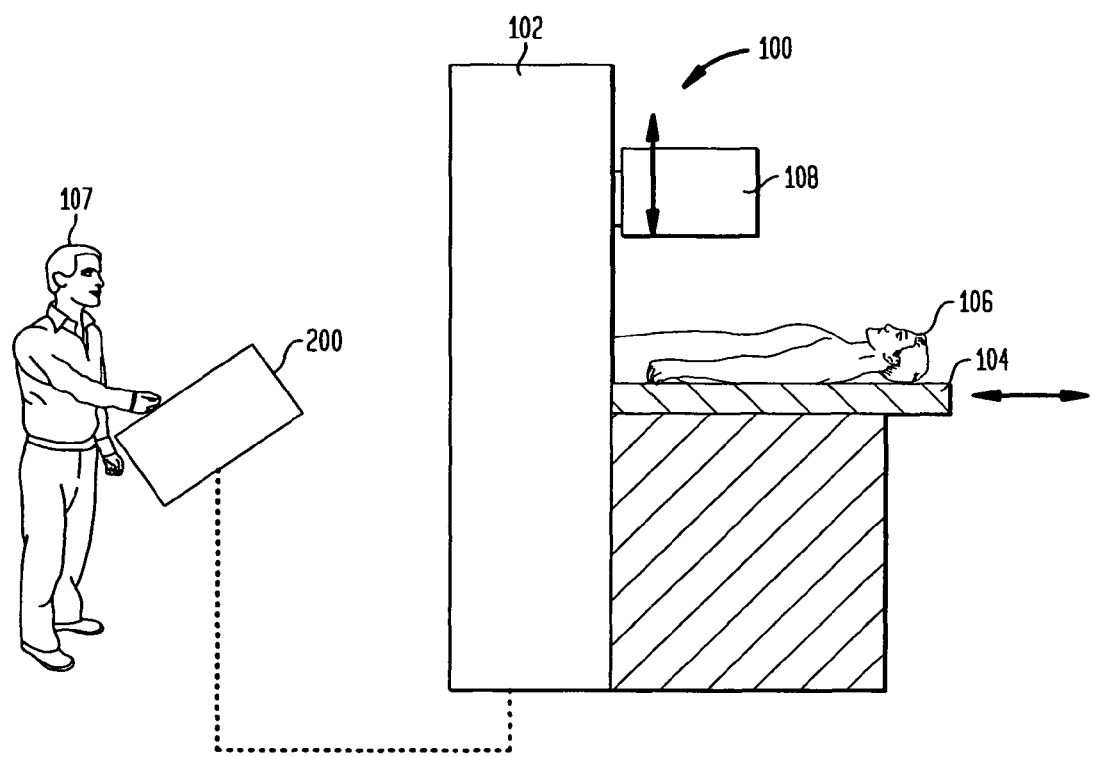
FIG. 1 is an illustrative nuclear imaging system with which illustrative embodiments of the invention may be implemented.
Figure 2:
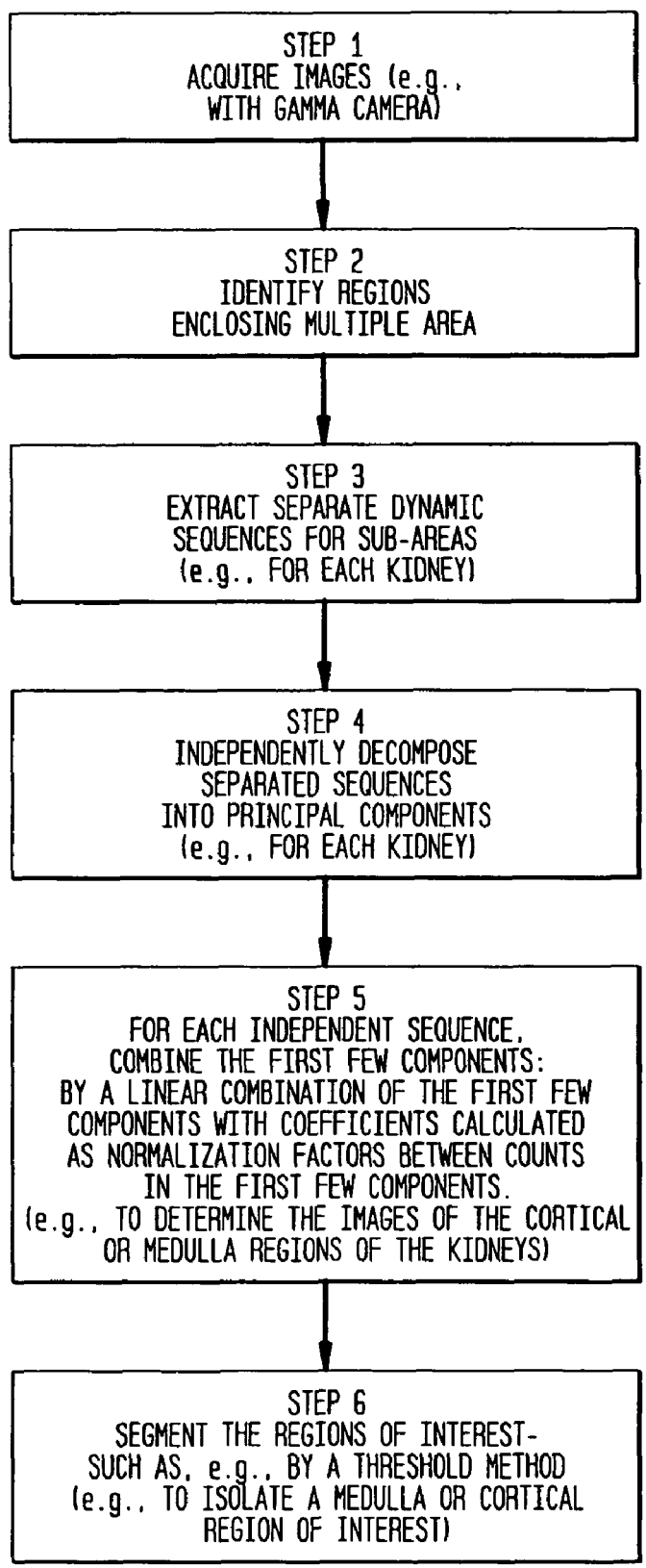
FIG. 2 is a flow diagram depicting illustrative procedural steps that may be performed in some illustrative embodiments of the invention.

In the preferred embodiments, regions of the kidneys on dynamic renal images are automatically detected and segmented using the methodology described below with reference to FIG. 2.

First, in Step 1, the system acquires images (such as, e.g., using a gamma camera or another imaging device to acquire a movie-like time sequence of images over a period of time), which images are made available for analyses, such as, e.g., by saving the image data in computer data storage, memory and/or the like for analysis. In this regard, the nature of this image acquisition can be like that known in the art, such as, e.g., as described in the various references incorporated herein-by reference or otherwise known in the art. Thereafter, the subsequent steps detailed below are performed for a dynamic analysis based on the acquired images.

Next, in Step 2, the system automatically identifies regions of the left kidney, the right kidney and the bladder. In some embodiments, this step can involve the development of a simple program or module that utilizes a priori anatomical knowledge to make a first estimation. For example, this may be based, for instance, on the a priori knowledge that, e.g., the bladder is below the kidneys and that there are two kidneys (i.e., typically), including the left and the right kidneys. In this regard, by way of example, a simple program or module can be utilized that looks at peaks in counts, with the understanding that the highest peaks should occur at the kidneys and bladder. In this manner, the system can, based on approximations and/or empirical data, identify regions (e.g., rectangular regions of interest) related to each kidney and the bladder.

Figure 4:
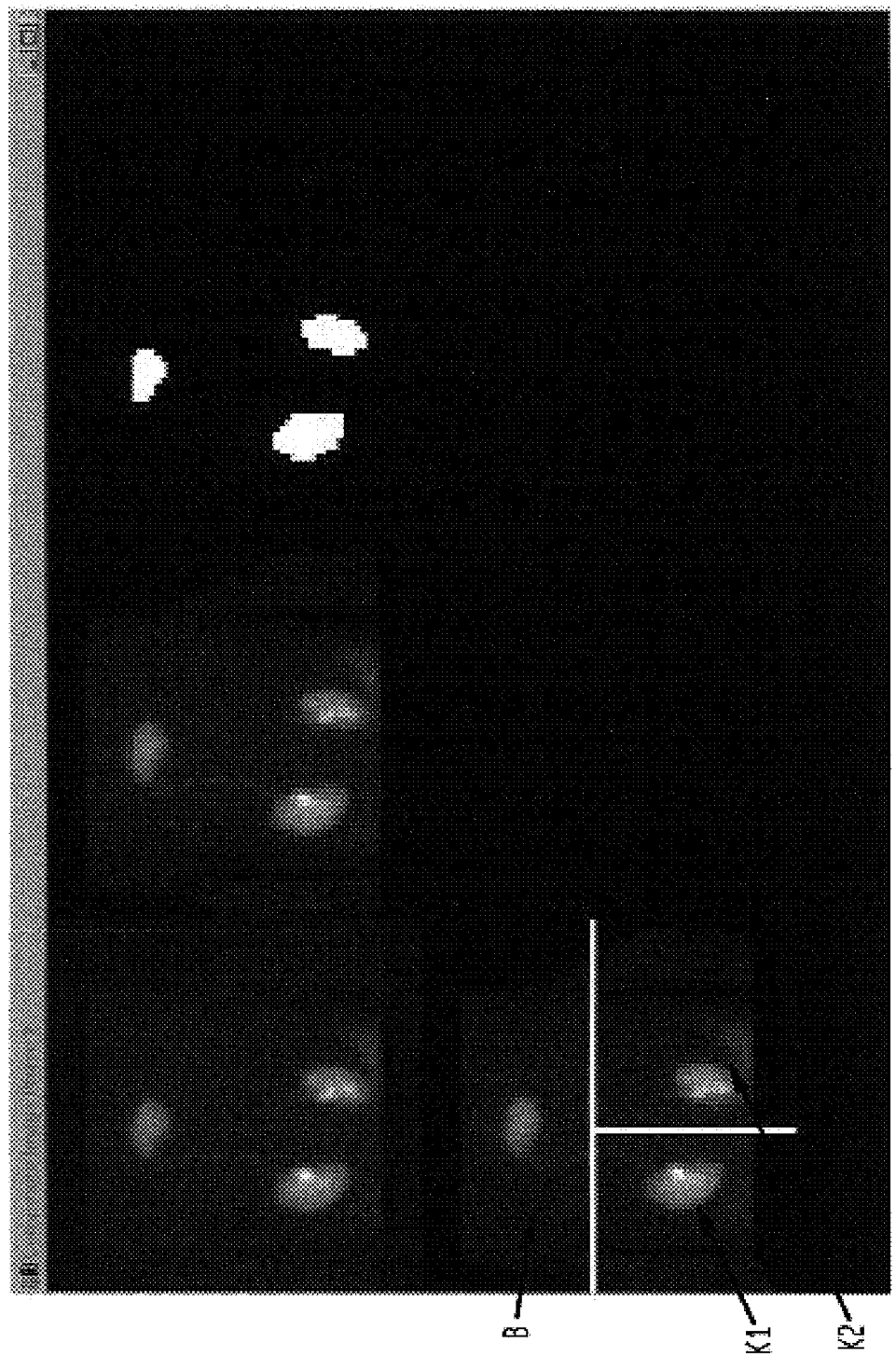
FIG. 4 illustrates the identification of regions B (i.e., a bladder region), K1 (i.e., a first kidney region) and K2 (i.e., a second kidney region)

By way of example, FIG. 4 illustrates the identification of regions B (i.e., a bladder region), K1 (i.e., a first kidney region) and K2 (i.e., a second kidney region). Although this has no impact on the analyses performed, for reference it is noted that, anatomically, the bladder of a human is located below the kidneys, such that the images shown in these illustrative and non-limiting examples are actually inverted from their actual anatomical positions.

Thus, at the completion of step 2, the computer has preferably isolated and identified the following regions:
1. the kidneys (left and right);
2. the bladder; and
3. the rectangular regions of interest (ROIs) around the kidneys.

Although an image is depicted in FIG. 4 that has been physically displayed for illustrative purposes, the system does not necessarily need to display this result, but merely to identify the regions to affect further processing.

Next, in Step 3, the system extracts two separate dynamic sequences, one for each region of interest around the kidneys. Thus, rather than performing a dynamic analysis of the entire image and/or a region including both kidneys and/or including the bladder, separate dynamic sequences are extracted from the image data obtained in Step 1. Among other things, isolation of each individual kidney can help to avoid perturbations and/or the like resulting from the other kidney and/or from the bladder that may otherwise affect analyses.

Next, in Step 4, the system performs a principal component analysis on each of the two separate dynamic sequences separately. Thus, principal component analysis is not carried out on the entire image that was acquired in Step 1, but rather on a region that contains only one organ—i.e., only one of the kidneys. In contrast, prior methods resulted in components showing a dynamic behavior of several organs, which rendered the organ level analysis to be rather difficult.

In this fourth step, the system independently decomposes the separated sequences into Principal Components (e.g., for each kidney). In this regard, these components are used in a novel methodology (see Step 5 below) in which (for each of the separate dynamic sequences), a combination of the first few components (i.e., components under the principal component analysis) is performed in a manner to determine the images of the regions of the kidney, e.g., the cortical and/or medulla regions of the kidney. In the preferred embodiments, this number of component images combined would be about 2, 3 or 4, and, most preferably, 3.

Figure 5A:
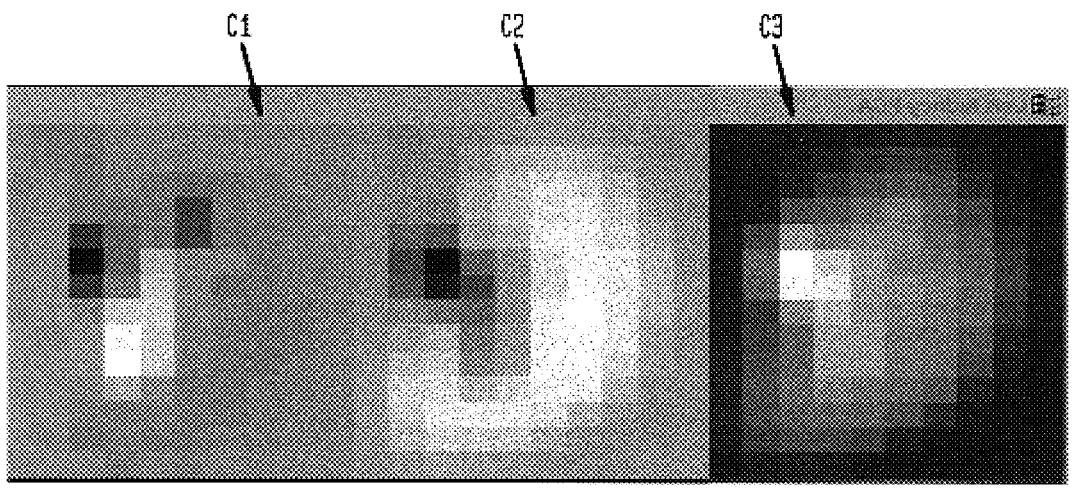
FIGS. 5(A) and 5(B) shows illustrative first, second and third component images related to the decomposition and principal components resulting for first and second kidney regions, respectively.
Figure 5B:
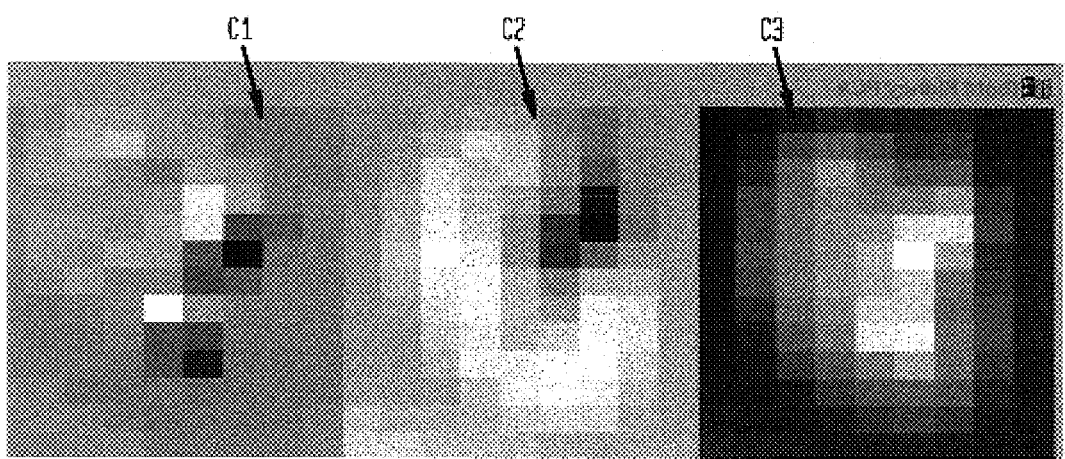

By way of example, FIG. 5(A) shows illustrative first, second and third component images C1, C2, and C3 related to the decomposition and principal components resulting for a first kidney region (i.e., related to a first region of interest ROI) and FIG. 5(B) shows illustrative first, second and third component images C1, C2, and C3 related to the decomposition and principal components resulting for a second kidney region (i.e., related to a second region of interest ROI).

Next, in Step 5, the components obtained in step 4 are used in a novel methodology in which (for each of the separate dynamic sequences), a combination of the first few components is performed in a manner to determine the images of the regions of the kidney, e.g., the cortical and/or medulla regions of the kidney. In particular, this combination preferably involves a linear combination of the first few component images, in which the coefficients are calculated in a manner to ensure the resulting images of the kidney regions, e.g., the cortical and/or medulla regions of the kidney. In the preferred embodiments, as noted above, this number of component images combined would be about 2, 3 or 4, and, most preferably, 3. Moreover, the coefficients are preferably calculated as normalization factors between the counts (NB: counts are typically based on the number of photons received, e.g., at a pixel or the like) in these first few components. In the preferred embodiments, the combinations are based on absolute values. Preferably, this calculation is performed as follows (NB: while the below formula is depicted in a representation for 2 components, the formula can be depicted in a representation for 3 components, etc.):

$$C0+C1*(\max C0/\mathrm{abs}(\min C1)) \qquad \mathrm{f1}$$

$$C0-C1*(\max C0/\mathrm{abs}(-\min C1)) \qquad \mathrm{f2}$$

Where, C0 is a first component, and C1 is a second component.

Here, if the value for the second component is positive, it is added to the first component(e.g., using f1), while if it is negative, it is subtracted from the first component(e.g., using f2).

Figure 6A:
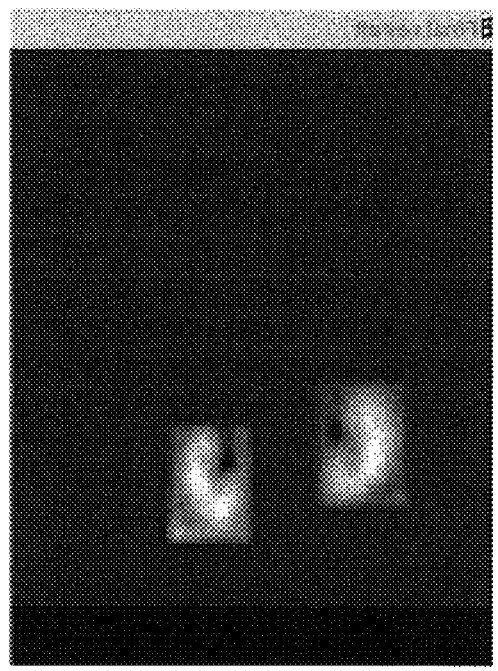
FIG. 6(A) shows the resultant combined images for both the first and second kidneys based on the respective images shown in FIGS. 5(A) and 5(B)

By way of example, FIG. 6(A) shows the resultant combined images for both the first and second kidneys based on the foregoing combination methodology based on the respective images shown in FIGS. 5(A) and 5(B). As shown, the combination achieves a good image of the cortical region of the kidneys.

Next, in Step 6, the system performs a simple segmentation of the regions of interest, such as, e.g., by a threshold method (e.g., to isolate a medulla or cortical region of interest). For example, a simple threshold method may select pixels from an input image whose gray values g fulfill the following condition: MinGray<=g<=MaxGray.

Figure 6B:
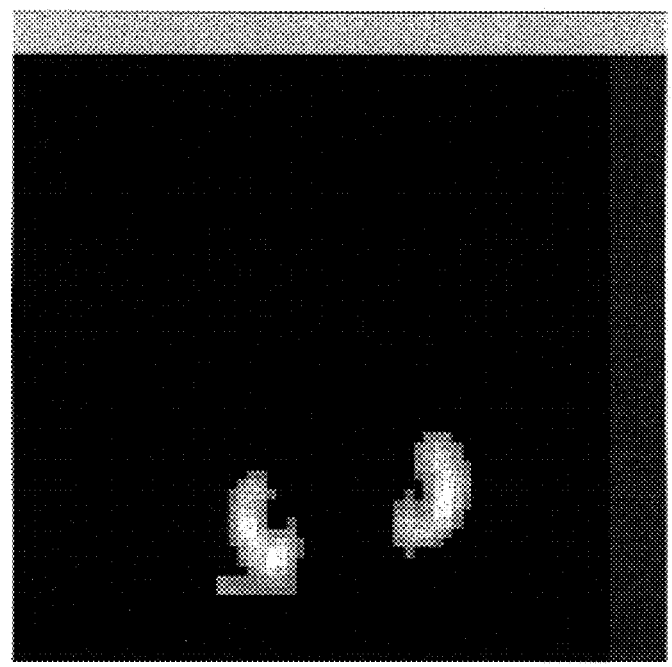
FIG. 6(B) shows the resultant image obtained with a simple 50% threshold segmentation methodology.

By way of example, FIG. 6(B) shows the resultant image obtained with a simple 50% threshold segmentation methodology.

Figure 7:
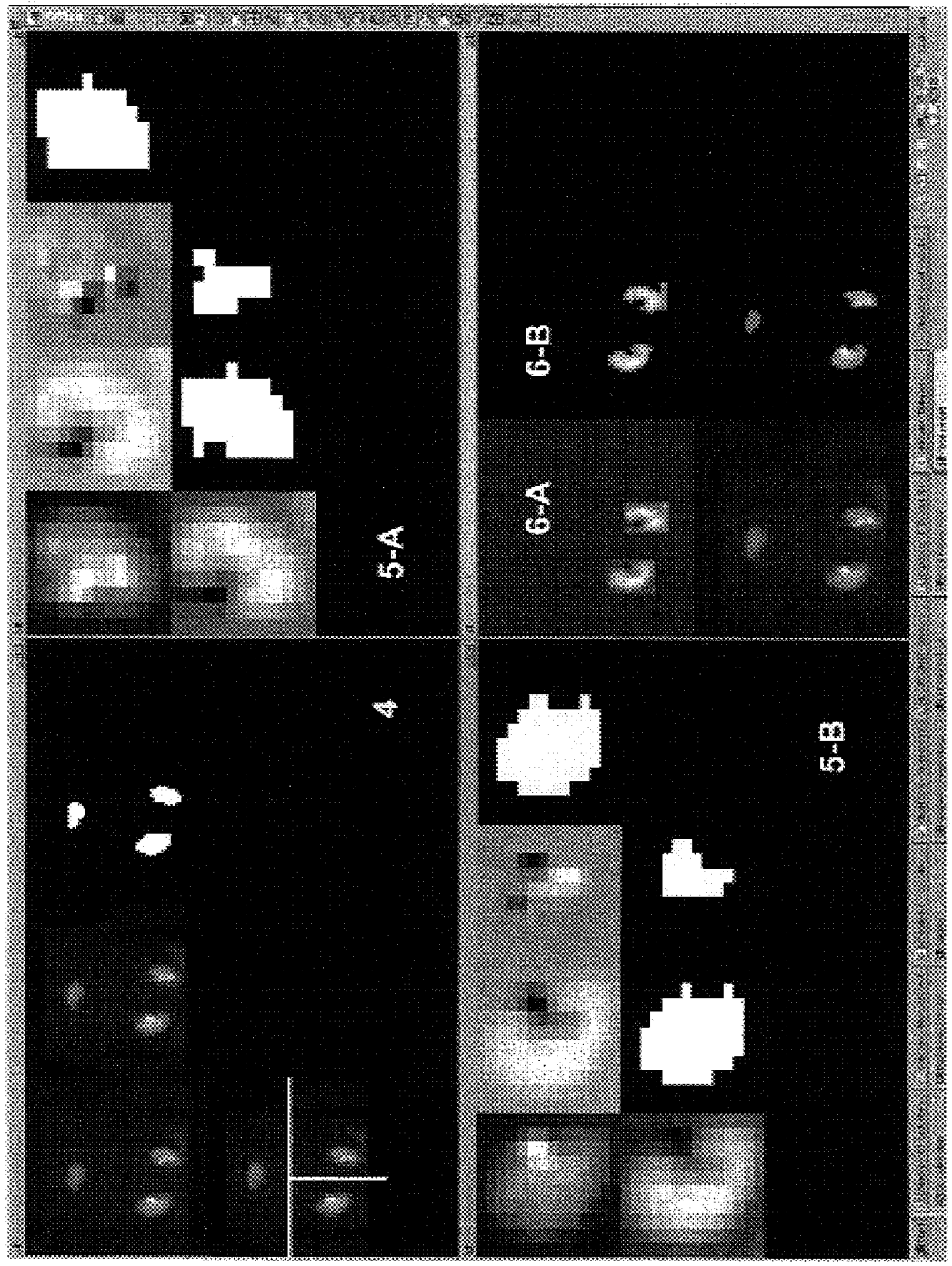
FIGS. 7 and 8 show some illustrative successful results in which regions of the kidneys on the dynamic renal images were automatically detected and segmented.
Figure 8:
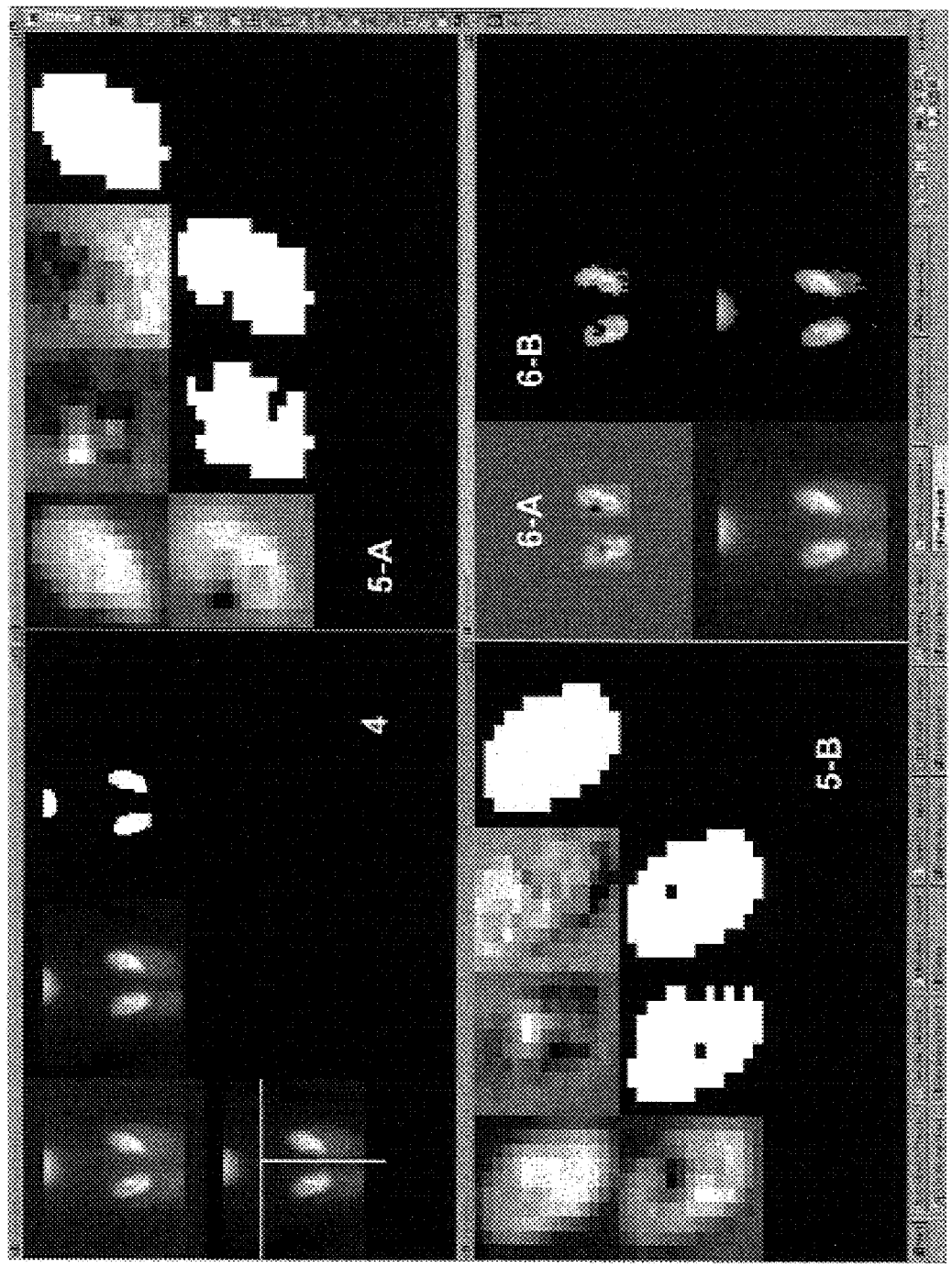

As demonstrated, in the preferred embodiments, the methodologies enable the automatic detection and segmenting of the regions of the kidneys on dynamic renal images. Illustrative embodiments have proven to achieve a good success rate in confidentially-conducted preliminary trials. By way of example, FIGS. 7 and 8 show some illustrative successful results from these trials in which regions of the kidneys on the dynamic renal images were automatically detected and segmented. In FIGS. 7 and 8, the illustrative images labeled 4, 5-A, 5-B, 6-A and 6-B are parallel to the images shown in FIGS. 4, 5(A), 5(B), 6(A) and 6(B), respectively.

Thus, the preferred embodiments of the invention can provide an accurate and automatic methodology for the detection of the kidney regions in renal dynamic studies, greatly improving upon a) existing automatic methods that do not perform well and that are effectively unworkable for the detection of such kidney regions and b) existing manual methods which are commonly performed despite being time consuming, being subject to human error and requiring substantial operator expertise.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. In the interpretation of the claims, the structure for all means-plus-function elements should not be improperly interpreted as corresponding to a computer programmed with the specific illustrative program as shown in FIGS. 9(A) to 9(J). Any and all means-plus-function elements that have structural correspondence to a programmed computer, hardware and/or firmware should be interpreted as such programmed computer, hardware and/or firmware programmed or configured to perform the recited function, without requiring any specific programming shown in FIGS. 9(A)-9(B). In addition, the language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A method for the automatic detection of kidney regions in a sequence of images from a dynamic image study, comprising:
   a) identifying in an image from said dynamic study a first region of interest around a first kidney and a second region of interest around a second kidney;
   b) extracting separate image data from said sequence corresponding to the respective regions of interest; and
   c) performing principal component analysis on said separate image data separately, wherein said performing principal component analysis includes, for each of said dynamic sequences, linearly combining a preselected number of component images of each region of interest, and wherein said linearly combining further includes calculating coefficients for said principal component analysis as normalization factors between counts in the first few component images.

2. The method of claim 1, wherein said linearly combining further includes calculating coefficients based on absolute values.

3. The method of claim 1, wherein said linearly combining is based on the following formulas:

$$C0+C1*(\max C0/\text{abs}(\min C1)); \quad\quad f1$$

$$C0-C1*(\max C0/\text{abs}(-\min C1)); \quad\quad f2$$

wherein
   C0 is a first component image, C1 is a second component image, f1 is a combination where C1 is positive, and f2 is a combination where C1 is negative.

4. The method of claim 1, wherein said preselected number of components includes between the first 2 to 4 components.

5. The method of claim 1, wherein said preselected number of components includes the first 3 components.

6. A system configured for the automatic detection of kidney regions in a sequence of images from a dynamic image study, comprising:
   a) means for identifying in an image from said dynamic study a first region of interest around a first kidney and a second region of interest around a second kidney;
   b) means for extracting image data from said sequence corresponding to respective regions of interest;
   c) means for performing principal component analysis on said separate image data separately; and
   d) means for linearly combining a preselected number of component images of each region of interest in said dynamic sequences, including means for calculating coefficients for said principal component analysis as normalization factors between counts in said preselected number of component images.

7. The system of claim 6, wherein said means for linearly combining further includes means for calculating coefficients based on absolute values.

8. The system of claim 6, wherein said means for linearly combining further includes means for combining based on the following formulas:

$$C0+C1*(\max C0/\text{abs}(\min C1)); \quad\quad f1$$

$$C0-C1*(\max C0/\text{abs}(-\min C1)); \quad\quad f2$$

wherein
   C0 is a first component image, C1 is a second component image, f1 is a combination where C1 is positive, and f2 is a combination where C1 is negative.

9. The system of claim 6, wherein said preselected number of components includes between the first 2 to 4 components.

10. The system of claim 6, wherein said preselected number of components includes the first 3 components.

11. A system configured for the automatic detection of organ regions in a sequence of images from a dynamic image study, comprising:
   a) a medical imaging camera for acquiring a time-sequence of images encompassing a plurality of organ regions of a patient;
   b) an identification module configured to identify regions of interest within said time-sequence of images relating to separate ones of said plurality of organ regions of the patient;
   c) an extraction module configured to extract respective dynamic sequences from the respective regions of interest; and
   d) an analysis module configured to perform principal component analysis on said respective dynamic sequences separately and to linearly combine a preselected number of component images for each of said dynamic sequences, wherein said analysis module is configured to calculate coefficients for said principal component analysis as normalization factors between counts in said preselected number of component images.

12. The system of claim 11, wherein said analysis module is configured to calculate coefficients based on absolute values.

13. The system of claim 11, wherein said analysis module includes means for combining the following formulas:

$$C0+C1*(\max C0/\mathrm{abs}(\min C1));\qquad \mathrm{f1}$$

$$C0-C1*(\max C0/\mathrm{abs}(-\min C1));\qquad \mathrm{f2}$$

wherein C0 is a first component image, C1 is a second component image, f1 is a combination where C1 is positive, and f2 is a combination where C1 is negative.

14. The system of claim 13, wherein said preselected number of components includes between the first 2 to 4 components.

15. The system of claim 13, wherein said preselected number of components includes the first 3 components.

16. A system for the automatic identification of cortical and/or medulla regions of the kidneys in renal dynamic imaging studies, comprising: a computer module configured to perform principle component analysis on a dynamic image data sequence corresponding to only one of said kidneys based on a linear combination of a preselected number of component image data with coefficients for said principal component analysis as normalization factors between counts in the first few component images.

17. The system of claim 16, wherein said computer module is configured to calculate coefficients based on absolute values.

18. The system of claim 16, wherein said analysis module includes means for combining based on the following formulas:

$$C0+C1*(\max C0/\mathrm{abs}(\min C1));\qquad \mathrm{f1}$$

$$C0-C1*(\max C0/\mathrm{abs}(-\min C1));\qquad \mathrm{f2}$$

wherein C0 is a first component image, C1 is a second component image, f1 is a combination where C1 is positive, and f2 is a combination where C1 is negative.

19. The system of claim 16, wherein said preselected number of components includes between the first 2 to 4 components.

20. The system of claim 16, wherein said preselected number of components includes the first 3 components.

* * * * *

UNITED STATES PATENT AND TRADEMARK OFFICE
CERTIFICATE OF CORRECTION

PATENT NO. : 7,668,359 B2
APPLICATION NO. : 11/165981
DATED : February 23, 2010
INVENTOR(S) : Xavier Battle It is certified that error appears in the above-identified patent and that said Letters Patent is hereby corrected as shown below:

On the Title Page, FIELD [73], Assignee Siemens "Meidcal" Solutions USA, Inc. should read
-- Medical --

Signed and Sealed this

Twentieth Day of April, 2010

David J. Kappos
*Director of the United States Patent and Trademark Office*